United States Patent [19]
Hart et al.

[11] Patent Number: 5,193,644
[45] Date of Patent: Mar. 16, 1993

[54] PIPELINE VIBRATION DAMPER

[75] Inventors: James D. Hart, Berkeley, Calif.; Richard Sause, Hellertown, Pa.; G. Wyche Ford, Anchorage, Ala.; Lloyd D. Brown, Plano, Tex.

[73] Assignee: Atlantic Richfield Company, Los Angeles, Calif.

[21] Appl. No.: 684,104

[22] Filed: Apr. 12, 1991

[51] Int. Cl.⁵ .............................................. F16F 7/00
[52] U.S. Cl. ............................... 181/207; 181/208, 209
[58] Field of Search ................ 181/207, 208, 209, 211, 181/218, 227; 248/610, 611, 612, 638

[56] References Cited

U.S. PATENT DOCUMENTS

| | | | |
|---|---|---|---|
| 3,048,649 | 8/1962 | McGavern | 181/207 |
| 3,314,503 | 4/1967 | Neubert | 181/207 |
| 4,716,986 | 1/1988 | Umemoto et al. | 181/207 |

Primary Examiner—Michael L. Gellner
Assistant Examiner—Khanh Dang
Attorney, Agent, or Firm—Michael E. Martin

[57] ABSTRACT

A vibration damper includes a suspended mass connected to a pipeline or similar structural member by a support ring and an assembly of interconnected, generally cylindrical damper members formed of an elastomer material suitable to be stressed in shear. The damper assembly is of modular construction so that the damper can be easily tuned to particular frequency and amplitude conditions of different pipes and spans, respectively.

16 Claims, 3 Drawing Sheets

PIPELINE VIBRATION DAMPER

BACKGROUND OF THE INVENTION

1. Field of the Invention

The present invention pertains to a vibration damper, particularly adapted to damp wind-induced vibrations of pipelines and the like.

2. Background

Many installations of fluid transmission pipelines require the pipe to be installed above the earth's surface on spaced-apart supports. For example, in certain Arctic environments such as the Kuparuk River, Alaska Oilfield, a substantial number of the gathering and transmission pipelines are supported above the delicate terrain. The aforementioned environment, in particular, is subject to sustained wind conditions which can induce vertical vibrations in above-ground pipelines due to well-known vortex shedding phenomena. These vibrations can be destructive and require correction to prevent catastrophic failure of the pipe.

The large variety of pipe sizes and spans between supports has created problems in developing effective vibration dampers, particularly of a type which can be conveniently modified to accommodate various vibration conditions. It is to this end that the present invention has been developed, with a view to providing a vibration damper that is inexpensive, modular in construction and easily adapted for use in minimizing the vibration of above-ground supported pipelines and similar structural members subject to vertical vibrations.

SUMMARY OF THE INVENTION

The present invention provides an improved vibration damper, particularly adapted for damping wind-induced oscillatory vibrations of above-ground supported fluid transmission pipelines and the like.

In accordance with one important aspect of the present invention, a vibration damper is provided which includes a mass and a modular damper assembly interconnecting the mass with a support bracket which is connected to a pipeline between support points for reducing vibrations of the pipeline, particularly those induced by windflow over the line.

In accordance with another important aspect of the present invention, a vibration damper is provided which includes a plurality of elastomer damper members which may be interconnected in a series configuration to provide the desired stiffness and damping characteristics. In particular, the damper members are adapted to be assembled in preselected modules of predetermined stiffness and damping capability to minimize the number of parts required and to provide easy adaptation for effective damping of particular frequencies of pipe vibration.

In accordance with another important aspect of the present invention, there is provided a damper assembly which utilizes a plurality of elastomer damper members which are supported in such a way that the forces exerted on the damper members impose primarily shear stresses on the damper members which optimizes the damping characteristics while minimizing bending stress on the damper members.

The present invention provides a vibration damper which is relatively uncomplicated, easy to assemble and install, is of a modular type construction to provide for a wide range of damping capacities and is relatively inexpensive and reliable for operation in rather harsh environments.

The abovementioned features and advantages of the present invention, together with other superior aspects thereof, will be further appreciated by those skilled in the art upon reading the detailed description which follows in conjunction with the drawing.

DESCRIPTION OF PREFERRED EMBODIMENTS

Figure 1:
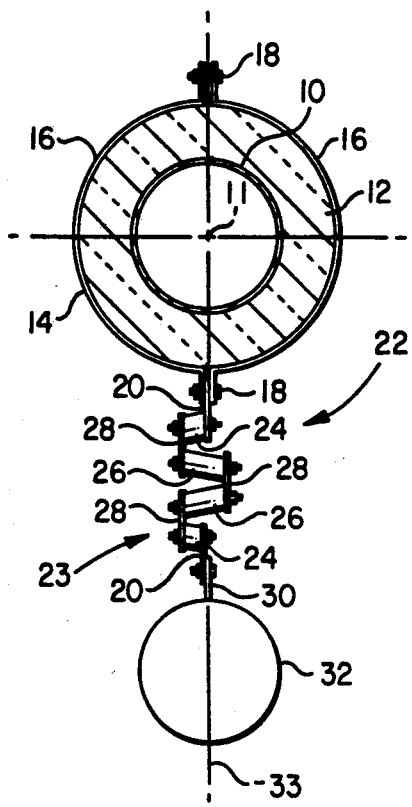
FIG. 1 is an elevation view taken perpendicular to a section of fluid transmission pipeline showing one preferred embodiment of a vibration damper in accordance with the present invention.

In the description which follows, like parts are marked throughout the specification and drawing with the same reference numerals, respectively. The drawing figures are not necessarily to scale, and certain features may be shown exaggerated in scale in the interest of clarity and conciseness.

Referring to FIG. 1, there is shown a transverse section view of an elevated above-surface pipeline 10 which is covered with a suitable insulating jacket 12 over which is secured a clamp 14 comprising opposed semicircular metal band members 16 suitably secured together by first and second bolt assemblies 18. One of the bolt assemblies 18 also supports a support link 20 for a pipeline vibration damper, generally designated by the numeral 22. The damper 22 includes a damper assembly 23 characterized by a plurality of elastomeric damper members 24 and 26 which are secured together by interconnecting link members 28. The links 20 and 28, which may be identical, comprise metal plates suitably fabricated to have spaced-apart holes formed therein for receiving threaded pin portions of the damper members 24 and 26 which will be described by way of example in conjunction with FIG. 3.

Figure 2:
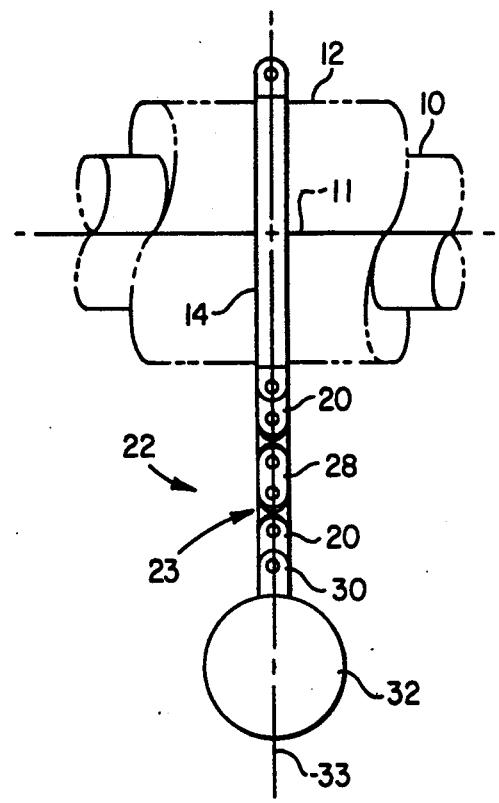
FIG. 2 is a side elevation of the damper illustrated in FIG. 1.

FIG. 2 is a side elevation of the damper 22 which further illustrates the damper member connecting links 20 and 28. The lower-most link 20 is connected to a support member 30 for a damper "mass" or weight member 32 which is preferably of a suitable shape to minimize the effects of wind forces thereon, considering the various directions from which the wind may act on the weight member. One preferred shape of the member 32 is spherical.

Figure 3:
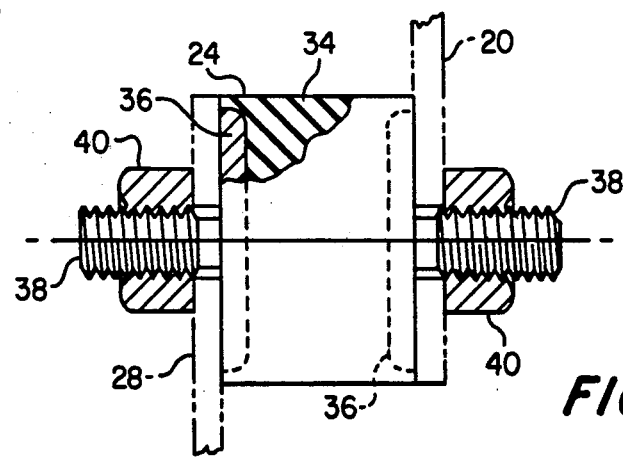
FIG. 3 is a detail view showing one of the elastomer damper members.

FIG. 3 illustrates, by way of example, the construction details and one connection method for interconnecting the damper members 24 and 26. The damper member 24, by way of example, includes a generally cylindrical elastomeric body 34 having opposed anchor plates 36 bonded thereto and supporting generally oppositely projecting threaded pin portions 38. The damper members 24 and 26 are thus secured to the connecting plates 20 and 28 by conventional threaded members 40 threaded over the pins 38. The members 26 are similarly constructed and are of suitable length such that, as shown in FIG. 1, a damper 22 may be assembled with a plurality of members 24 and 26 arranged in such a way that a central vertical axis 33 of the weight member 32 is aligned with and intersects the longitudinal centerline 11 of the pipe 10 and also comprises the line of action of displacement of the member 32 and the damper assembly during its operation. The weight member 32 hangs directly downwardly placing primarily shear stresses on the circular cross-sectional areas of the cylindrical elastomer bodies of these members.

By selecting a predetermined combination of damping members 24 and 26, interconnected by the connecting plates or links 20 and 28, and by selecting the mass of the member 32 and the material and geometry (shape and size) of the members 24 and 26, a preferred vibration-damping characteristic can be obtained in accordance with known principles of vibration and auxiliary mass dampers. Since the stiffness of the damper 22 as well as the mass of the member 32 affect its damping characteristics, this stiffness may be modified by adding or subtracting members 24 and 26 to obtain the overall stiffness characteristic of the damper 22 in accordance with known principles. For example, the series-connected elements or damper members 24 and 26 provide a collective stiffness $k_{23}$ for the damper assembly 23 which has a value according to the following relationship:

$$k_{23} = \frac{1}{1/k_{24} + 1/k_{26} + 1/k_{24} + 1/k_{26}}$$

where $k_{24}$ and $k_{26}$ are the stiffness values for each of the members 24 and 26 in the damper 22, for example. The stiffness is also determined by the characteristics of the elastomer material making up the body 34, for example. A preferred material is an elastomeric blend suitably treated to have environmental protection such as ultraviolet and weathering resistance and being of sufficient strength to preclude structural failure due to the weight of the member 32 and any oscillatory movement of the pipe 10.

In damping vibrations of pipelines, it is desirable to provide a damper which has a fundamental natural frequency of vibration, $w_n$, along the vertical axis 33 substantially equal to the natural frequencies of vibration of the pipeline that are prone to wind-induced vibrations. Moreover, it has also been deemed desirable to damp the vibratory energy of the pipeline with a damper of the type according to the present invention wherein the ratio of the damping coefficient, c, to the critical damping coefficient $c_c$, is in the range of 0.05 to 0.20.

Accordingly, the damper 22 is provided by selecting the mass, m, of the weight member 32 and the stiffness, $k_{23}$, to satisfy the equations:

$$w_n = \sqrt{k_{23}/m} \quad \text{and} \quad c_c = 2mw_n$$

together with the above-noted ratio of the damping coefficient, c, to the critical damping coefficient, $c_c$. The ratio is often determined experimentally by testing samples of damper members 24 and 26 of different materials, size and shape to determine the damping coefficient, c.

Application of the dampers to a pipeline involves tuning the natural frequency of the dampers to the natural frequency of the pipeline. There are two main issues to be considered in applying the dampers: (1) the stiffness (inverse of compliance) of the elastomeric members depends on the ambient temperature, the age of the elastomer, the magnitude of the strain induced by movement of the weight member, and the frequency of vibration, and (2) the pipeline will typically have numerous natural vibration frequencies and associated modes of vibration that need to be controlled. These issues are addressed as described below.

First, a characteristic damper natural frequency is predicted based on the average ambient temperature, the average damper member stiffness, considering aging of the elastomer material over the damper service life, the maximum expected strain in the damper member, and the required damper natural frequency. The characteristic damper frequency is tuned to a pipeline frequency by varying the number of elastomeric damper members and the weight of the suspended weight member.

Then, for typical configurations of above-ground pipelines, which exhibit bands of closely-spaced natural frequencies which require vibration control, three dampers are preferably employed. A low frequency damper is tuned to the lowest natural frequency in the band, a high frequency damper is tuned to the highest natural frequency in the band and a medium frequency damper is tuned to a frequency approximately half way between the lowest and highest natural frequencies in the band. The recommended pattern for damper placement begins with a high frequency damper in the first pipe span (at midspan) next to a straight run pipe anchor and continues with a low frequency damper then a middle or medium frequency damper in the adjacent spans (each at midspan). The pattern is continued throughout the straight run of the pipeline to the last straight run span before an expansion loop, for example.

Figure 4:
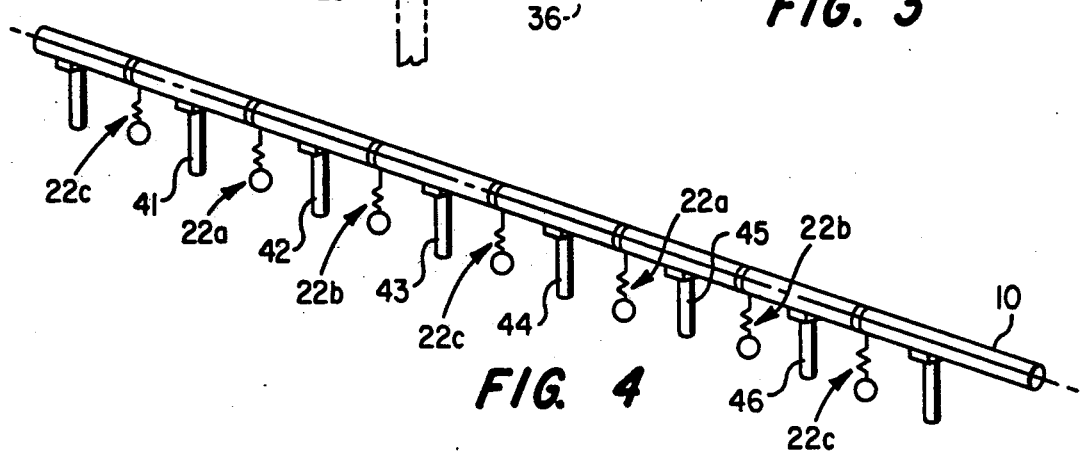
FIG. 4 is a perspective view, in somewhat schematic form, of a portion of a fluid transmission pipeline showing a typical installation of vibration dampers according to the present invention.

FIG. 4 shows a typical installation of several of the dampers 22 on a segment of pipeline 10 spanning spaced-apart supports 41, 42, 43, 44, 45 and 46. Such a multispan pipeline is prone to wind-induced vibration and has a band of frequencies of vibration that are close to the fundamental frequency of vibration of the pipeline. Dampers 22a, 22b and 22c are provided to damp vibration over the band of frequencies. A typical installation of the dampers on a multispan pipeline includes dampers with three different natural frequencies installed in a repeated pattern at sequential midspan locations along the pipeline. A high frequency damper 22a is provided to damp the high end of the frequency band and a low frequency damper 22b to damp the low end of the frequency band. A middle frequency damper 22c is disposed as shown to damp the middle of the frequency band. The pattern illustrated is repeated along the length of the pipeline 10 with one damper at each midspan location between supports.

The pipeline frequencies of vibration that are prone to wind-induced vibrations and vibration amplitudes may be measured by placing accelerometers on the pipe at selected positions between the supports and taking measurements for various wind conditions which may induce vibration.

By way of example, pipelines supported aboveground in the Kuparak River Oilfield of Alaska have been successfully damped with vibration dampers of the type described herein for various wind conditions and temperatures ranging from +50° F. to −45° F. Vibration measurements taken of an 8.0-inch diameter steel pipeline of 0.322-inch wall thickness carrying gas over 55-foot spans between supports have found fundamental natural frequencies of vertical pipe vibration of about 2.0 Hz to 4.0 Hz and vertical displacements of as much as 0.40 inches. This pipeline has been substantially damped for various wind conditions in temperatures ranging from +50° F. to −45° F. by a family of three dampers, similar to the damper 22, each having a weight member 32 of approximately 50 lbs. or 75 lbs. and using a natural rubber blended elastomer material for the damper members 24 and 26. The members 24 and 26 were of nominal diameters of 1.0 inches and lengths of 1.0 and 2.0 inches, respectively.

Figure 7:
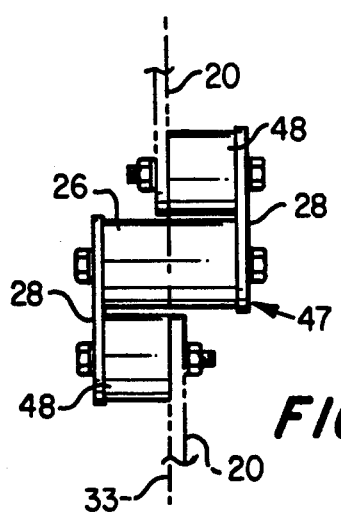
FIGS. 7 through 11 show alternate embodiments of a damper assembly for the damper according to FIG. 1.
Figure 8:
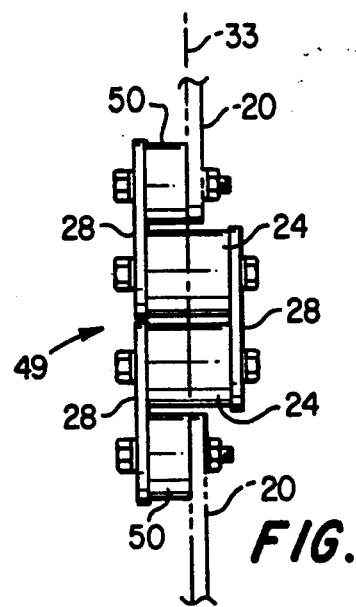
Figure 9:
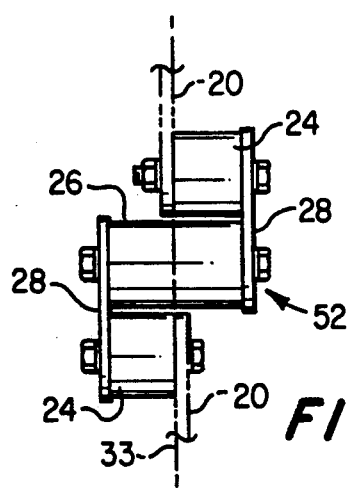
Figure 10:
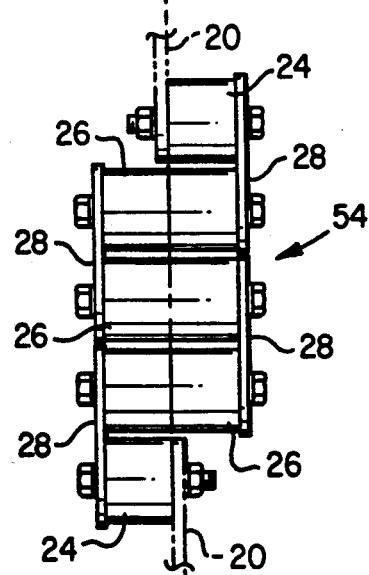
Figure 11:
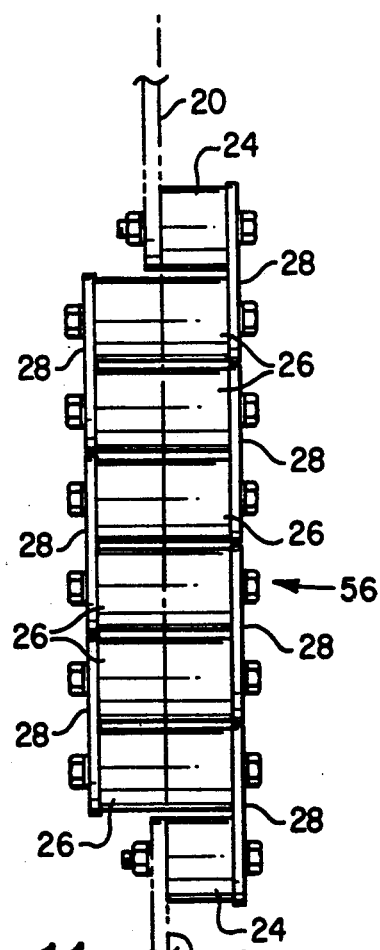

Referring now to FIGS. 7 through 11, there are illustrated various embodiments of damper assemblies which may be substituted for the damper assembly 23, for example. FIG. 7 illustrates a so-called single-tiered damper assembly 47 having a single elastomer body member 26 interconnected to the plate members 20 by links 28 and substantially rigid spacer members 48 having the same configuration as the damper members 24 so that the line of action of the damper assembly 47 is along the axis 33. FIG. 8 illustrates a two-tiered damper assembly 49 utilizing the damper members 24 interconnected by the links 28 to spacer members 50, again so that the line of action of the damper is along the axis 33. FIG. 9 illustrates a three-tiered damper assembly 52, made up of one damper member 26, two damper members 24 and the requisite interconnecting links 28, again arranged so that the line of action of the damper may be along the axis 33. FIGS. 10 and 11 illustrate damper assemblies 54 and 56, respectively, which are exemplary and are of so-called five-tiered and eight-tiered configuration, respectively. Accordingly, as will be appreciated from the foregoing, the variety of damper assemblies which may be assembled using the damper members 24 and 26, together with a minimum number of spacer members, provides substantial advantages for the vibration damper of the present invention.

Figure 6:
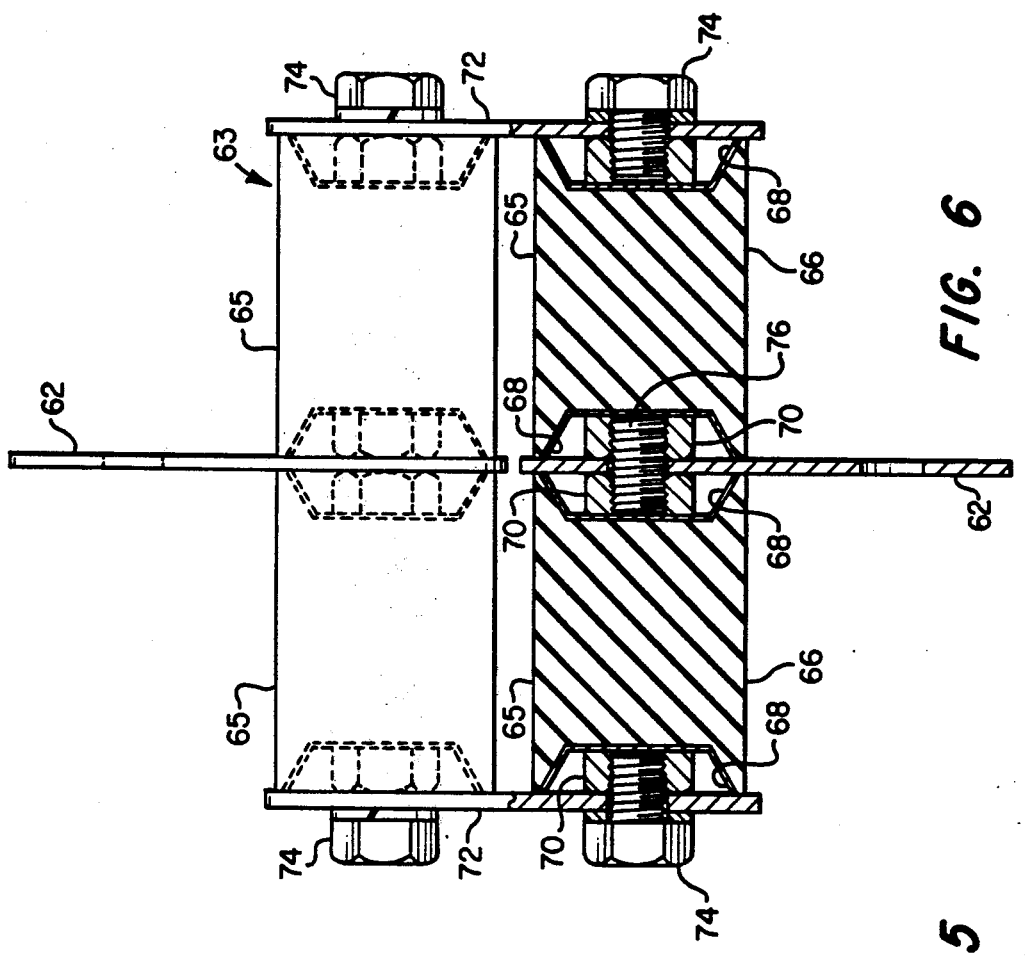
FIG. 6 is a detail view of the damper assembly of the embodiment of FIG. 5.
Figure 5:
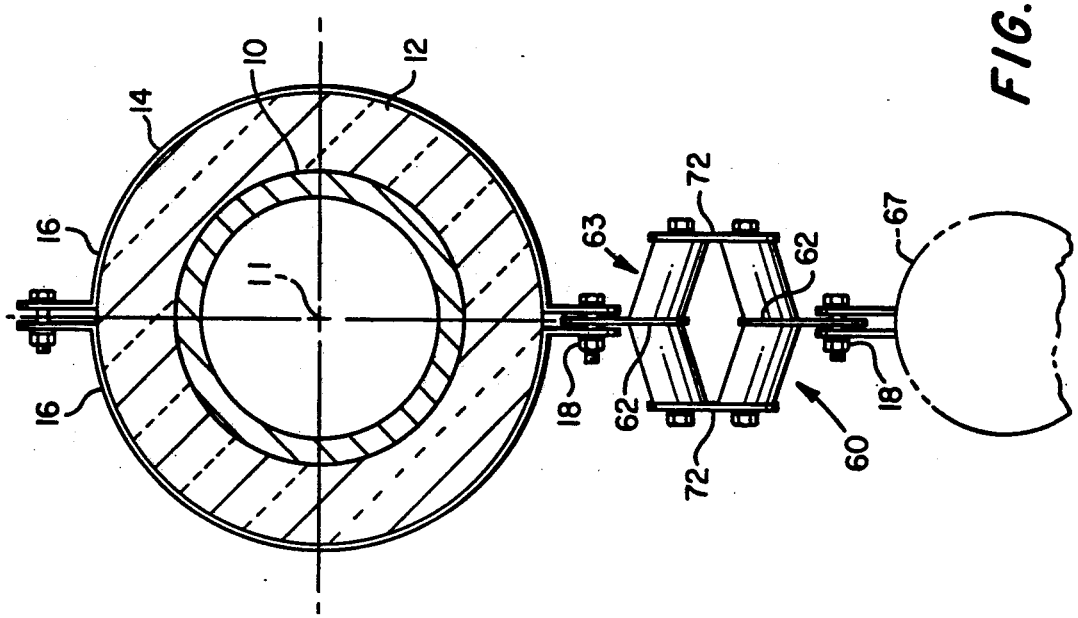
FIG. 5 is a view similar to FIG. 1 showing an alternate embodiment of a vibration damper according to the present invention.

Referring now to FIGS. 5 and 6, an alternate embodiment of a pipeline vibration damper in accordance with the present invention is illustrated and generally designated by the numeral 60. The damper 60 is similar to the damper 22 in regard to utilization of the support ring 14, shown secured around the insulation 12 of a pipe section 10, and connected to a damper support link 62 similar in construction to the links 20 and 28. A damper assembly 63 interconnects the support ring 14 with a weight member 67. The damper assembly 63 is characterized by two links 72, see FIG. 6 also, and a plurality of damper members 65 arranged in both series and parallel relationship. Each of the damper members 65 comprises a generally cylindrical elastomeric body 66 with opposed generally cup-shaped support plates 68 bonded thereto and provided with threaded members 70 projecting in opposite directions and suitably welded to the support plates. An assembly of two of the isolator members 65 in parallel relationship is secured to one of the links 62, and each of the assemblies of 65 is secured to the other in series relationship by connecting link plates 72. Bolt assemblies 74 secure each of the damper members 65 to the respective connecting links 72, and threaded pins 76 are utilized to connect each of the opposed paired damper members 65 to each other and to the links 62. As shown in FIG. 5, the bottom link 62 is suitably connected to a weight member 78.

Each of the damper members 65 is similar in construction to the damper members 24 and 26 except for the construction of the end connector or securing members. The overall assembly of the damper members 65 is such that the series/parallel relationship modifies the stiffness ($k_{63}$) of the damper assembly 63 such that it equals the stiffness ($k_{65}$) of each of the damper members 65, respectively. The symmetrical arrangement of the opposed damper members 65 provides for suspending the weight 67 without torsional loading on the damper members. The damper members 65 are substantially loaded in shear to obtain a balance with respect to damping characteristics and applied material stresses on elastomeric damper members loaded in that fashion. The line of action of the damper 60 is also normal to the pipeline 10 and centered through the damper assembly and the weight member 67.

One advantage of the damper 22, in particular, in applications in the Kuparuk River Oilfield is that by utilizing elastomeric damper members such as the members 24 and 26, the stiffness and damping ratio of these members may be adapted to increase with decreasing ambient temperature, and the effectiveness of the damper increases in proportion to the tendency for a pipeline to vibrate at a greater amplitude.

Although preferred embodiments of an improved vibration damper have been described in detail herein, those skilled in the art will recognize that various substitutions and modifications may be made to the specific embodiments described without departing from the scope and spirit of the invention recited in the appended claims.

What is claimed is:

1. A vibration damper for damping vibratory motion of a section of pipeline and the like between support points of said pipeline, comprising:
support means for connecting said damper to a section of said pipeline between supports points;
a mass member having a predetermined weight; and
damper means interconnecting said support means and said mass member for suspending said mass member from said section of pipeline and characterized by at least one damper member comprising an elastomeric member having opposed spaced apart support parts for connecting said one damper member to said support means and in supporting relationship to said mass member, respectively, such that said one damper member is subjected primarily to shear stresses due to the weight of said mass member and the vibratory motion of said section of pipeline for damping such vibratory motion.

2. The damper set forth in claim 1 wherein:
said damper includes a plurality of damper members interconnected to each other and to said support means and said mass member.

3. The damper set forth in claim 2 wherein:
said damper members are connected to each other at support points at opposite ends of said damper members, respectively.

4. The damper set forth in claim 2 wherein:
each of said damper members comprise a generally cylindrical elastomeric body and said support parts comprise opposed connecting members at opposite ends of said cylindrical body, respectively, for connecting said damper members to at least one of another damper member and a connecting link between said mass member and said section of pipeline.

5. A damper for damping vibration of a section of pipeline and the like, comprising:
support means for connecting said damper to said section of pipeline between support points for said section of pipeline;
a mass member having a predetermined weight; and
a damper assembly interconnecting said support means and said mass member and comprising a plurality of resilient damper members which are interconnected in such a way as to be subjected primarily to shear stresses due to the weight of said mass member and vibration of said section of pipeline for damping said vibration, said damper members being connected together in series relationship at opposed support points on each of said damper members.

6. The damper set forth in claim 5 wherein:
said damper member comprise elastomeric bodies having means at opposite ends of said bodies forming support parts for connecting said damper members in series relationship and for supporting said mass member.

7. The damper set forth in claim 6 wherein:
each of said damper members comprises a generally cylindrical elastomeric body of a material the stiffness of which increases with decreasing temperature of said body.

8. The damper set forth in claim 5 wherein:
said damper assembly has a damping factor in a range of about 0.05–0.20.

9. A vibration damper for damping generally vertical oscillatory vibrations of a section of pipeline, said damper comprising:
support means for connecting said damper to said section of pipeline;
a mass member; and
a damper assembly comprising a plurality of resilient damper members and connecting means for interconnecting said resilient damper members to each other in such a way that each of said damper members is subjected primarily to shear stresses, and said damper assembly is connected to said support means and said mass member so that a line of action of said damper while damping oscillatory vibrations of said pipeline passes generally through a central vertical axis of said mass member and a central longitudinal axis of said pipeline and to impose such shear stresses on said damper members.

10. The damper set forth in claim 9 wherein:
each of said damper members comprises a generally cylindrical elastomeric body member.

11. The damper set forth in claim 9 wherein:
each of said damper members comprises a generally cylindrical elastomeric body member connected to at least one of said support means, said mass member and another damper member at opposite ends of each of said damper members, respectively.

12. The damper set forth in claim 9 wherein:
said damper members are connected at opposite ends to respective spacer members such that said damper assembly is connected between said support means and said mass member to provide said line of action.

13. The damper set forth in claim 12 wherein:
said damper members have a first predetermined length and said spacer members comprise damper members of a second predetermined length substantially about one-half the first predetermined length of said damper members.

14. The damper set forth in claim 9 wherein:
said damper assembly is characterized by at least two damper members of a first length and at least one damper member of a second length equal to about twice said first length, and said damper members are interconnected at their opposite ends to each other and to said support means to provide a damper assembly wherein said damper members are each subjected substantially only to shear stresses acting across said damper members and a line of action substantially equidistant between said opposite ends.

15. In a generally horizontally extending pipeline supported above ground on a plurality of spaced-apart supports to form plural unsupported spans of pipe, a plurality of vibration dampers connected to said pipeline at selected ones of said spans for damping vibrations of said pipe over a range of vibration frequencies, each of said dampers being adapted to damp a selected frequency of vibration in said range, and each of said dampers comprising:
means for connecting said damper to a section of pipe between said supports;
a mass member having a predetermined weight;
damper means interconnecting said means for connecting and said mass member characterized by at least one damper member which is subjected primarily to shear stresses due to the weight of said mass member and the vibrations of said pipe for damping such vibrations; and
said dampers are arranged serially along said pipe in such a way that a first damper is connected to a section of pipe between supports and is adapted to damp vibrations at a low-frequency in said range, a second damper is connected to said pipe between supports at an adjacent span and is adapted to damp vibrations at a high frequency in said range, and a third damper is connected to said pipe between supports at a span adjacent to said adjacent span and is adapted to damp vibrations at a middle frequency in said range.

16. The invention set forth in claim 15 wherein:
said dampers are connected to said spans of pipe at about midspan between said supports, respectively.

* * * * *